United States Patent [19]

Readman

[11] Patent Number: 4,804,196
[45] Date of Patent: Feb. 14, 1989

[54] SEALING ASSEMBLY FOR A DEVICE HAVING A ROTATABLE SHAFT

[75] Inventor: John Readman, Rockford, Ill.

[73] Assignee: Sundstrand Corporation, Rockford, Ill.

[21] Appl. No.: 797,401

[22] Filed: Nov. 12, 1985

[51] Int. Cl.⁴ .............................................. F16J 15/34
[52] U.S. Cl. .................................. 277/75; 277/81 R; 277/92
[58] Field of Search ...................... 277/71, 75, 92, 82, 277/81 R

[56] References Cited

U.S. PATENT DOCUMENTS

| | | | |
|---|---|---|---|
| 2,214,243 | 9/1940 | Casson | 277/92 X |
| 2,341,900 | 2/1944 | Boden | 277/92 |
| 2,362,363 | 11/1944 | Doede | 277/92 X |
| 2,463,695 | 3/1949 | Jensen | 277/92 X |
| 2,634,904 | 4/1953 | Clerc | 277/92 X |
| 2,853,020 | 9/1958 | Hollinger et al. | 277/92 X |
| 3,073,657 | 1/1963 | Oxford | 277/92 X |
| 3,279,804 | 10/1966 | Blair | 277/92 |
| 3,291,493 | 12/1966 | Blair | 277/92 |
| 3,341,259 | 9/1967 | Schulz et al. | 277/92 X |
| 3,460,845 | 8/1969 | Hasselbacher | 277/92 |
| 3,652,183 | 3/1972 | Pottharst, Jr. | |
| 3,796,507 | 3/1974 | Smykal et al. | |
| 3,831,950 | 8/1974 | Bentley et al. | 277/75 |
| 3,940,154 | 2/1976 | Olsson | 277/92 |
| 4,256,316 | 3/1981 | Reinsma | 277/92 |
| 4,306,727 | 12/1981 | Deane et al. | 277/92 X |
| 4,309,039 | 1/1982 | Irick | 277/72 R X |
| 4,327,921 | 5/1982 | Reinsma et al. | 277/92 X |
| 4,421,327 | 12/1983 | Morley et al. | 277/92 X |
| 4,457,521 | 7/1984 | Morley | |

FOREIGN PATENT DOCUMENTS 225629 12/1968 U.S.S.R. ................................. 277/92

Primary Examiner—Allan N. Shoap
Attorney, Agent, or Firm—Wood, Dalton, Phillips, Mason & Rowe

[57] ABSTRACT

To achieve increased critical speeds in turbines, pumps and other machines by limiting overhang while eliminating secondary sealing components, a face seal is provided for a rotatable shaft. The face seal includes an annular sealing ring formed of a rigid material and having a sealing surface adapted to be disposed in a plane substantially transverse to the rotatable shaft. The face seal also includes a static seal-carrying member formed of a rigid material and spaced from the annular sealing ring at a location remote from the sealing surface. Additionally, an elastomeric seal is disposed between the annular sealing ring and the static seal-carrying member in integrally associated relation.

13 Claims, 1 Drawing Sheet

SEALING ASSEMBLY FOR A DEVICE HAVING A ROTATABLE SHAFT

FIELD OF THE INVENTION

This invention relates to a face seal, and more specifically, to a face seal for a rotatable shaft.

BACKGROUND OF THE INVENTION

Face seals of many different types have been proposed for a variety of applications over the years. One typical application is that of a sealing assembly for a machine or other device having a rotating shaft where oil, water or other fluid must be sealed from other cavities in the assembly. Generally, however, face seals such as those exemplified in U.S. Pat. Nos. 4,457,521; 3,796,507; and 3,652,183 have been formed of a length that limits the performance of the machine.

In particulr, face seals are known to create spans between bearings and other components causing the critical speeds of the rotating system to fall into the running range of the machine. One example of the adverse effects of the length of a face seal is the overhang that has been required in the cantilevered arrangement of a turbine. In addition, the face seal between a conventional bearing and sundyne pump is of a length sufficient to cause an overhang detrimental to the performance characteristics of the overall rotating system.

In making a face seal for such applications, a problem is to reduce the overhang in the turbine, pump or other machine by reducing the length of the seal. It is a related problem to increase the critical speeds of the turbine, pump or other machine to a point well above the normal running range. Moreover, another problem is to simplify the design of the face seal while reducing the weight and cost without any detrimental impact on the sealing function.

While overcoming problems of this type, it is also desirable to provide a face seal in a sealing assembly for a device having a rotatable shaft with improved efficiency. It is also desirable to provide a seal having long term reliability whether utilized in a device running continuously or one that might only be used at an indeterminate point in the future such as a missile stored in a silo for many years. Further, it is desirable to provide high integrity sealing characteristics in a face seal requiring no secondary sealing components to be utilized.

The present invention is directed to overcoming the above stated problems and accomplishing the stated objects.

SUMMARY OF THE INVENTION

It is the principal object of the present invention to provide a new and improved face seal capable of increasing critical speeds in turbines, pumps and other machines. More specifically, it is an object of the invention to provide a face seal having a simplified design with reduced weight and cost and improved efficiency where the length of the seal is reduced to lessen overhang in the turbine, pump or other machine. It is likewise an object of the invention to provide a sealing assembly for a device having a rotatable shaft which provides high integrity sealing without requiring secondary sealing components.

An exemplary embodiment of the invention achieves the foregoing objects in a face seal for a rotatable shaft. The seal includes an annular sealing ring formed of a rigid material and having a sealing surface adapted to be disposed in a plane substantially transverse to the rotatable shaft. The seal also includes a static seal-carrying member formed of a rigid material and spaced from the annular sealing ring at a location remote from the sealing surface. Additionally, elastomeric seal means is disposed between the annular sealing ring and the static seal-carrying member in integrally associated relation.

In the exemplary embodiment, the elastomeric seal means is bonded to both the static seal-carrying member and the annular sealing ring at the remote location to accommodate limited relative movement therebetween. In particular, the elastomeric seal means accommodates movement between the annular sealing ring and the static seal-carrying member in the direction of the rotatable shaft. Moreover, the elastomeric seal means is deformable when the annular sealing ring is subjected to relative movement toward the static seal-carrying member to provide an oppositely directed continuous biasing force for sealed engagement of the sealing surface with a mating annular sealing ring.

In a preferred embodiment, the elastomeric seal means is disposed between and bonded to an outwardly facing annular surface of the annular sealing ring and an inwardly facing annular surface of the static seal-carrying member. It is also advantageous for the elastomeric seal means to be generally rectangular in axial cross section and disposed between the annular sealing ring and the static seal-carrying member so as to be subjected to a shear force or, alternatively, to a compressive force to provide the oppositely directed continuous biasing force for sealed engagement of the sealing surface with the mating annular sealing ring. With either arrangement, the face seal is well adapted to be utilized as stationary seal means in a sealing assembly for a device having a rotatable shaft where the stationary seal means is in engagement with rotatable seal means in a manner overcoming the problems discussed hereinabove.

Other objects and advantages will become apparent from the following specification taken in connection with the accompanying drawings.

DESCRIPTION OF THE PREFERRED EMBODIMENTS

Figure 1:
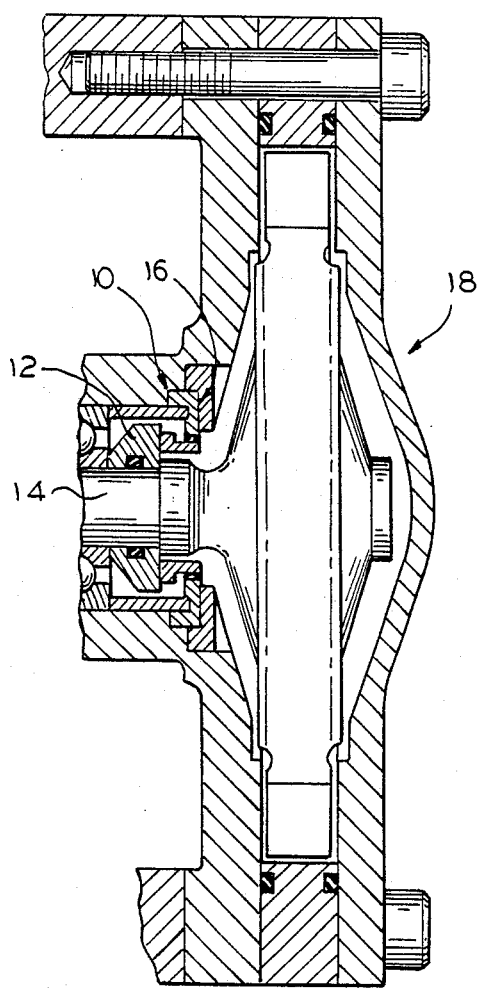
FIG. 1 is a partial sectional view of a turbine utilizing a face seal according to the invention.

An exemplary embodiment of a sealing assembly for a device having a rotatable shaft is illustrated in FIG. 1. The sealing assembly 10 includes rotatable seal means such as the annular sealing ring 12 mounted on the rotatable shaft 14 for rotational movement therewith and stationary seal means such as the face seal 16 associated with a device such as a turbine 18. In addition, the face seal 16 has an opening 20 adapted to receive the rotatable shaft 14 (see FIG. 2).

Figure 2:
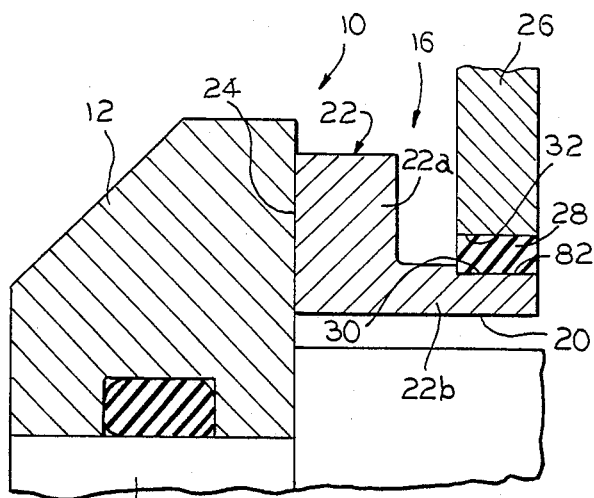
FIG. 2 is a sectional view illustrating the face seal of FIG. 1.

With the arrangement illustrated in FIG. 2, the face seal 16 includes an annular sealing ring 22 having a sealing surface 24 in engagement with the annular sealing ring 12. It will also be seen that the annular sealing ring 22 is joined to a static seal-carrying member 26 through elastomeric seal means such as the seal 28. By positioning the components in this fashion, the seal 28 accommodates limited relative movement between the annular sealing ring 22 and the static seal-carrying member 26 (see FIG. 3).

More particularly, the annular sealing ring 22 is formed of a rigid material and the sealing surface 24 is disposed in a plane substantially transverse to the rotatable shaft 14. It is also advantageous for the static seal-carrying member 26 to be formed of a rigid material and to be spaced from the annular sealing ring 22 at a location remote from the sealing surface 24 with the seal 28 disposed between the annular sealing ring 22 and the static seal-carrying member 26 in integrally associated relation. When the annular sealing ring 22 is subjected to relative movement toward the static seal-carrying member 26, the seal 28 is deformable to provide an oppositely directed continuous biasing force for sealed engagement of the sealing surface 24 with the mating annular sealing ring 12.

Still referring to FIG. 2, the seal 28 is disposed between and bonded to the annular sealing ring 22 and the static seal-carrying member 26 in axially spaced relation to the sealing surface 24. Since the annular sealing ring 22 is generally L-shaped having a radially extending portion 22a defining the sealing surface 24 and an axially extending portion 22b disposed substantially parallel to the rotatable shaft, the seal 28 can be bonded to an outwardly facing annular surface 30 of the axially extending portion 22b of the annular sealing ring 22 and to an inwardly facing annular surface 32 of the static seal-carrying member 30 disposed in radially spaced confronting relation thereto, both of which are in axially spaced relation to the radially extending portion 22a of the annular sealing ring 22. As a result, the seal 28 is capable of accommodating limited relative movement between the annular sealing ring 22 and the static seal-carrying member 26 in the direction of the rotatable shaft 14, i.e., the axial direction.

As shown, the seal 28 is generally rectangular in axial cross section with parallel inner and outer surfaces 28a and 28b conforming to the parallel annular surfaces 30 and 32, respectively. It is also disposed between the annular sealing ring 22 and the static seal-carrying member 26 so as to be subjected to a shear force when the annular sealing ring 22 is subjected to relative movement toward the static seal-carrying member 26 (compare FIGS. 2 and 3). In this manner, the seal 28 can be deformed to provide the oppositely directed continuous biasing force for sealing engagement of the sealing surface 24 with the mating annular sealing ring 12.

Figure 3:
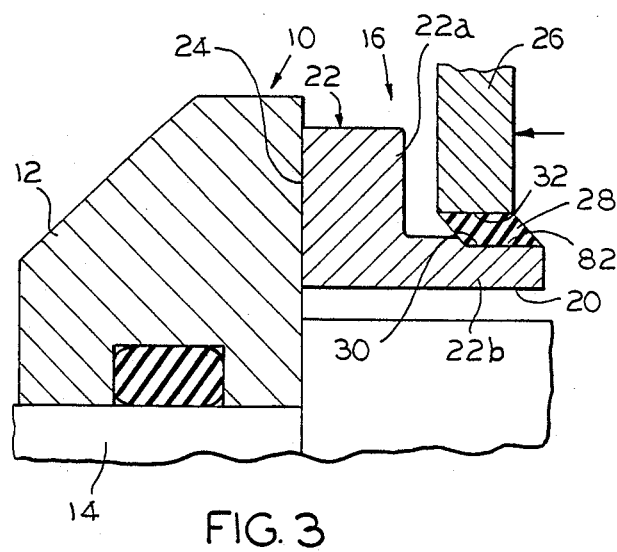
FIG. 3 is a sectional view similar to FIG. 2 illustrating the face seal in an assembled position.

In the embodiment illustrated in FIGS. 1 through 3, the annular sealing ring is advantageously formed of carbon. It will also be appreciated that the seal 28 can be formed of any of a variety of a suitable elastomeric materials depending upon the fluid being sealed, the performance parameters for a particular application, and other related considerations. In addition, the static seal carrying member 26 can be formed of a suitable metallic material.

Figure 4:
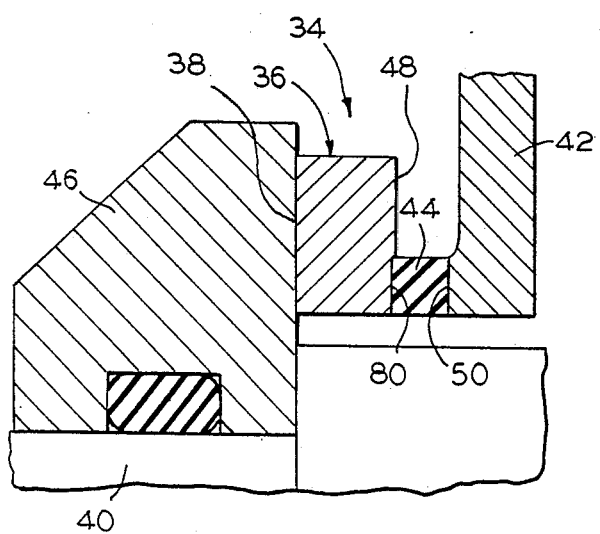
FIG. 4 is a sectional view similar to FIG. 2 illustrating another embodiment of face seal.

Referring to FIG. 4, an alternative embodiment of face seal 34 is illustrated. The face seal 34 again includes an annular sealing ring 36 formed of a rigid material and having a sealing surface 38 adapted to be disposed in a plane substantially transverse to the rotatable shaft 40.

It also again includes a static seal-carrying member 42 formed of a rigid material and spaced from the annular sealing ring 36 at a location remote from the sealing surface 38. The face seal 34 again includes a seal 44 disposed between the annular sealing ring 36 and the static seal-carrying member 42 in integrally associated relation. However, the exact position of the seal 44 relative to the annular sealing ring 36 and the static seal-carrying member 42 differs from the position of the seal 28 in the embodiment of FIGS. 1 through 3.

In particular, the seal 44 is disposed between the annular sealing ring 36 and the static seal-carrying member 42 so as to be subjected to a compressive force when the annular sealing ring 36 is subjected to relative movement toward the static seal-carrying member 42. Since the seal 44 is again formed of an elastomeric material and has a generally rectangular axial cross section, it provides an oppositely directed continuous biasing force for sealed engagement of the sealing surface 38 with the rotatable seal means such as the mating annular sealing ring 46. Because of the elastomeric nature of the seal 44, and the relative position of the annular sealing ring 36 and the static seal-carrying member 42, the seal 44 is capable of accommodating limited relative movement between the annular sealing ring 36 and the static seal-carrying member 42 for this purpose.

Still referring to FIG. 4, the annular sealing ring 36 is generally rectangular in axial cross section. It will also be seen that the annular sealing ring 36 has a pair of surfaces including the sealing surface 38 and a surface 48 facing axially in the opposite direction where both surfaces 38 and 48 are in spaced parallel planes extending substantially transverse to the rotatable shaft 40. Also as shown, the static seal-carrying means has an axially facing surface 50 in confronting relation to the axially facing surface 48 of the annular sealing ring 36.

With this arrangement, the seal 44 is disposed between and bonded to the spaced confronting surfaces 48 and 50 of the annular sealing ring 36 and the static seal-carrying member 42 in axially spaced relation to the sealing surface 38 of the annular sealing ring 36.

Figure 5:
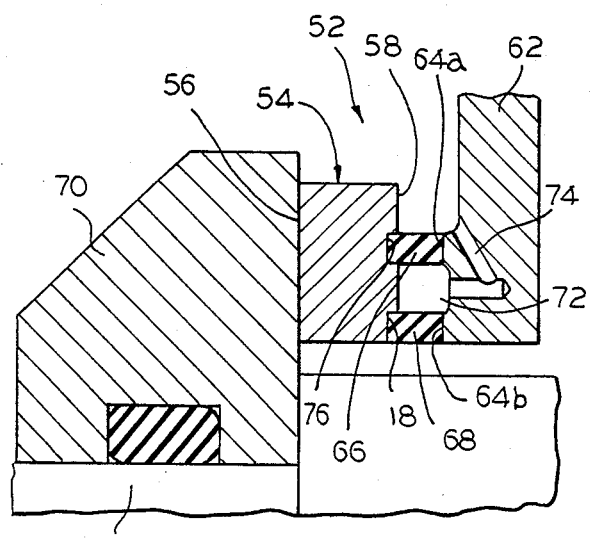
FIG. 5 is a sectional view similar to FIG. 2 illustrating still another embodiment of face seal.

Referring to FIG. 5, still another embodiment of face seal 52 is illustrated which is similar to the embodiment illustrated in FIG. 4 in that it includes an annular sealing ring 54. It will be seen that the annular sealing ring 54 is also generally rectangular in axial cross section and has a pair of surfaces 56 and 58 facing axially in opposite directions in spaced parallel planes substantially transverse to the rotatable shaft 60, and the face seal 52 again includes a static seal-carrying member 62 having axially facing surfaces 64a and 64b in axially spaced confronting relation to the axially facing surface 58 of the annular sealing ring 54. However, as shown, the face seal 52 utilizes a pair of radially spaced seals 66 and 68 each of which is generally rectangular in axial cross section and disposed between the annular sealing ring 54 and the static seal-carrying member 62.

With this arrangement, the radially spaced seals 66 and 68 are subjected to a compressive force when the annular sealing ring 54 is subjected to relative movement toward the static seal-carrying member 62. It will be appreciated that this provides an oppositely directed continuous biasing force for sealed engagement of the sealing surface 56 with rotatable seal means such as the mating annular sealing ring 70. It will also be seen that the face seal 52 includes an annular chamber 72 defined by the pair of radially spaced seals 66 and 68 and the annular sealing ring 54 and static seal-carrying member 62. Moreover, with the embodiment illustrated in FIG. 5, means are provided for communicating with the chamber 72 remote from the rotatable shaft 60 in the form of a bore 74 to relieve pressure upon compression of the seals 66 and 68.

In the embodiment illustrated in FIG. 5, the axially facing surface 58 includes circumferential grooves 76 and 78 adapted to receive the seals 66 and 68, respectively. It will also be seen that the axially facing surfaces 64a and 64b are provided on slight circumferential projections on the static seal-carrying member 62. While not essential, this arrangement is desirable for bonding the seals 66 and 68 to the annular sealing ring 54 and the static seal-carrying member 62 in a stable fashion.

Similarly, the embodiment illustrated in FIG. 4 can include a circumferential groove 80 adapted to receive the seal 44. It will also be seen that the axially facing surface 50 can be provided on a slight circumferential projection on the static seal-carrying member 42. Once again, this facilitates bonding the seal 44 to the annular sealing ring 36 and the static seal-carrying member 42 in a stable fashion.

Also, the embodiment illustrated in FIGS. 1 through 3 can be formed in a related fashion. It will be seen that the outwardly facing annular surface 30 can be provided with a radial undercut to receive the seal 28. As before, this facilitates bonding the seal 28 to the annular sealing ring 22 and the static seal-carrying member 26 in a stable fashion, particularly considering the shear force applied to the seal 28 (see FIG. 3).

While not previously discussed, it will be seen that the mating annular sealing rings 12, 46 and 70 can be provided with suitable circumferential grooves accommodating O-rings in conventional fashion. It will also be seen that the static seal-carrying member 26 can include both a radially extending portion 26a and an axially extending portion 26b adapted to cooperate with other structure of a device such as the turbine 18, including a retaining ring 84 that can be welded to the housing of the turbine 18, as could either of the other embodiments. Alternatively, any of the embodiments can be formed as self-contained cartridges adapted to be welded directly into a housing.

As for the seals 28, 44, 76 and 78, all of which are formed of elastomeric material, they can be bonded to the respective annular sealing rings 22, 36, and 54, all of which can be formed of carbon, and to the static seal-carrying members 26, 42, and 62, all of which can be formed of a suitable metallic material, by any conventional bonding technique including laser welding to thereby eliminate the need for carriers or anti-rotation components.

Moreover, in all embodiments, the seal is placed at or near the center of pressure to provide a hydrostatically balanced face seal with the resulting assembly providing a high integrity seal that does not require any secondary seal or sealing components. More specifically, the seal, such as 22, is pressure balanced by reason of the relative proportions of the radially extending portion 22a and the elastomeric seal means or seal 28. In this connection, the high pressure side acts between the radially extending porton 22a of the annular sealing ring 22 and the elastomeric seal means or seal 28 carried by the static seal-carrying member 26. In addition, low pressure acts between the opening 20 of the face seal 16 and the rotatable shaft 14 and against the axially extending portion 22b of the annular sealing ring 22 and the elastomeric seal means or seal 28 carried by the static seal-carrying member 26 remote from the radially extending portion 22a of the annular sealing ring 22. By utilizing the shear or compression of an elastomeric seal, the face seal is capable of providing spring loading in addition to pressure balance accomplished through selection of the radial position and thickness of the elastomeric seal relative to the center of pressure of the carbon face seal.

While the foregoing there has been set forth preferred embodiments of the invention, it is to be understood that the invention is only to be limited by the spirit and scope of the appended claims.

I claim:

1. A sealing assembly for a device having a rotatable shaft, comprising:

rotatable seal means formed of a rigid material and being adapted to be mounted on said rotatable shaft for rotational movement therewith; and a face seal adapted to cooperate with said rotatable seal means in sealing relation including an annular sealing ring, a static seal-carrying member and elastomeric seal means;

said annular sealing ring being formed of a rigid material and having a sealing surface adapted to be disposed in a plane substantially transverse to said rotatable shaft, said annular sealing ring having a portion extending radially outwardly of said elastomeric seal means in axially spaced relation to said static seal-carrying member, said sealing surface including said radially extending portion, said radially extending portion defining a surface facing axially in a direction opposite said sealing surface;

said static seal-carrying member being formed of a rigid material and being axially spaced from said radially extending portion of said annular sealing ring at a location axially remote from said axially oppositely facing surface thereof;

said device being exposed to low pressure on the side of said annular sealing ring adjacent said rotatable shaft and being exposed to high pressure on the side of said annular sealing ring opposite said rotatable shaft;

said elastomeric seal means being disposed between said annular sealing ring and said static seal-carrying member in integrally associated relation, said elastomeric seal means being bonded to both said static seal-carrying member and said annular sealing ring, said elastomeric seal means accommodating limited relative axial movement between said annular sealing ring and said static seal-carrying member in the direction of said rotatable shaft, said elastomeric seal means being deformable when said annular sealing ring is subjected to relative movement toward said static seal-carrying member to provide an oppositely directed continuous biasing force acting against said annular sealing ring for sealed engagement of said sealing surface with said rotatable seal means;

said high pressure acting against said axially oppositely facing surface of said annular sealing ring to cooperate with said elastomeric seal means for sealed engagement of said sealing surface with said rotatable seal means.

2. The sealing assembly as defined by claim 1 wherein said annular sealing ring is generally L-shaped having an axially extending portion disposed substantially parallel to said rotatable shaft.

3. The sealing assembly as defined by claim 1 wherein said axially extending portion of said annular sealing ring has an outwardly facing annular surface, said elastomeric seal means being bonded to said outwardly facing annular surface in axially spaced relation to said radially extending portion of said annular sealing ring.

4. The sealing assembly as defined in claim 1 wherein said axially extending portion of said annular sealing ring has an outwardly facing annular surface, said static seal-carrying member having an inwardly facing annular surface in radially spaced confronting relation thereto.

5. The sealing assembly as defined by claim 4 wherein said elastomeric seal means is disposed between and bonded to said outwardly facing annular surface of said annular sealing ring and said inwardly facing annular surface of said static seal-carrying member in axially spaced relation to said axially oppositely facing surface of said annular sealing ring.

6. The sealing assembly as defined by claim 1 wherein said elastomeric seal means is generally rectangular in axial cross section and disposed between said annular sealing ring and said static seal-carrying member so as to be subjected to a shear force when said annular sealing ring is subjected to relative movement toward said static seal-carrying member to provide said oppositely directed continuous biasing force cooperating with said high pressure for sealed engagement of said sealing surface with said rotatable seal means.

7. The sealing assembly as defined by claim 1 wherein said elastomeric seal means is generally rectangular in axial cross section and disposed between said axially oppositely facing surface of said annular sealing ring and said static seal-carrying member so as to be subjected to a compressive force when said annular sealing ring is subjected to relative movement toward said static seal-carrying member to provide said oppositely directed continuous biasing force for sealed engagement of said sealing surface with said rotatable seal means.

8. The sealing assembly as defined by claim 1 wherein said annular sealing ring is generally rectangular in axial cross section, said sealing surface and said axially oppositely facing surface being disposed in spaced parallel planes substantially transverse to said rotatable shaft.

9. The sealing assembly as defined by claim 8 wherein said elastomeric seal means is bonded to said axially oppositely facing surface.

10. The sealing assembly as defined by claim 8 wherein said static seal-carrying member has an axially facing surface in axially spaced confronting relation to said axially oppositely facing surface of said annular sealing ring.

11. The sealing assembly as defined by claim 10 wherein said elastomeric seal means is disposed between and bonded to said spaced confronting surfaces of said annular sealing ring and said static seal-carrying member in axially spaced relation to said sealing surface of said annular sealing ring.

12. The sealing assembly as defined by claim 1 wherein said elastomeric seal means includes a pair of radially spaced seals each of which is generally rectangular in axial cross section and disposed between said annular sealing ring and said static seal-carrying member so as to be subjected to a compressive force when said annular sealing ring is subjected to relative movement toward said static seal-carrying member to provide said oppositely directed continuous biasing force cooperating with said high pressure for sealed engagement of said sealing surface with said rotatable seal means.

13. The sealing assembly as defined by claim 12 including an annular chamber defined by said pair of radially spaced seals and said annular sealing ring and said static seal-carrying member and further including means for communicating with said chamber remote from said rotatable shaft.

* * * * *